US009286088B2

(12) United States Patent
Thiruveedu et al.

(10) Patent No.: US 9,286,088 B2
(45) Date of Patent: Mar. 15, 2016

(54) USER INTERFACE FOR INTERACTION WITH VIRTUAL MACHINE

(75) Inventors: Prasad Thiruveedu, Hyderabad (IN); Rahul S. Newaskar, Hyderabad (IN); Eric P. Traut, Bellevue, WA (US); Hari Krishna Pammi, Hyderabad (IN); Yogesh K. Sharma, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1705 days.

(21) Appl. No.: 12/400,033

(22) Filed: Mar. 9, 2009

(65) Prior Publication Data

US 2010/0229114 A1    Sep. 9, 2010

(51) Int. Cl.
    G06F 15/177    (2006.01)
    G06F 9/455     (2006.01)
    H04L 29/08     (2006.01)
    G06F 9/44      (2006.01)

(52) U.S. Cl.
    CPC ............ *G06F 9/45504* (2013.01); *H04L 67/36* (2013.01); *G06F 9/442* (2013.01); *G06F 9/4418* (2013.01)

(58) Field of Classification Search
    CPC . G06F 9/5055; G06F 9/5077; G06F 21/6218; G06F 2009/45562; G09G 2370/22; G09G 5/006; G09G 5/14; H04N 7/26
    See application file for complete search history.

(56) References Cited

U.S. PATENT DOCUMENTS

| | | | |
|---|---|---|---|
| 6,266,059 B1 | 7/2001 | Matthews, III et al. | |
| 6,748,525 B1 | 6/2004 | Hubacher et al. | |
| 7,356,677 B1 * | 4/2008 | Rafizadeh | 713/300 |
| 8,028,040 B1 * | 9/2011 | Hobbs et al. | 709/219 |
| 2005/0125519 A1 | 6/2005 | Yang et al. | |
| 2006/0202964 A1 * | 9/2006 | Liaw et al. | 345/168 |
| 2006/0236347 A1 | 10/2006 | Holovacs | |
| 2008/0155124 A1 * | 6/2008 | Compton et al. | 709/250 |
| 2008/0229227 A1 * | 9/2008 | Bantz et al. | 715/771 |
| 2009/0216975 A1 * | 8/2009 | Halperin et al. | 711/162 |
| 2009/0293055 A1 * | 11/2009 | Carroll et al. | 718/1 |
| 2010/0042636 A1 * | 2/2010 | Lu | 707/100 |
| 2010/0050111 A1 * | 2/2010 | Duffy | 715/781 |
| 2010/0115532 A1 * | 5/2010 | Peterson | 719/320 |
| 2011/0161482 A1 * | 6/2011 | Bonola et al. | 709/223 |

OTHER PUBLICATIONS

"Overview of the Cisco 2500 Series Access Server", Retrieved at<<http://www.cisco.com/en/US/docs/routers/access/2500/software/user/guide/prodov.html>>, Dec. 24, 2008, pp. 2.
"Combining this Method with Remote Debugging", Retrieved at<<http://msdn.microsoft.com/en-us/library/cc748100.aspx>>, Dec. 24, 2008, pp. 3.

\* cited by examiner

*Primary Examiner* — Boris Pesin
*Assistant Examiner* — Ayesha Huertas Torres
(74) *Attorney, Agent, or Firm* — John Jardine; Kate Drakos; Micky Minhas

(57) ABSTRACT

Systems, methods, and computer program products are described that provide a user interface to a user of a first operating system to enable the user to interact with a second operating system executing in a virtual machine. If the first and second operating systems are in communication in accordance with an operating system remote terminal (OSRT) protocol, such as Remote Desktop Protocol, a first user interface is provided as the user interface. If the first and second operating systems are not in communication in accordance with the OSRT protocol, a second user interface is provided as the user interface.

20 Claims, 7 Drawing Sheets

USER INTERFACE FOR INTERACTION WITH VIRTUAL MACHINE

BACKGROUND OF THE INVENTION

1. Field of the Invention

The present invention generally relates to virtual machines. In particular, the present invention is related to techniques for providing a user interface for interacting with an operating system executing in a virtual machine.

2. Background

An operating system traditionally consumes substantially all of the resources of a physical computer on which it executes. However, a software-implemented virtual machine may be also executed on the physical computer to enable a user of the physical computer to execute a second operating system in the context of the virtual machine. The first operating system, which operates independently from the virtual machine, provides a user interface that enables the user to interact with the second operating system. The virtual machine buffers pixels generated by the second operating system and transfers the pixels to the interface for display as video output to the user.

User interfaces for interacting with a virtual machine traditionally provide hardware-based operational capabilities for interfacing to the second operating system, but not software-based operational capabilities (referred to herein as "enhanced features") that might be enabled by modern operating systems. Example hardware-based operational capabilities include enabling the user to view video output of the virtual machine, enabling the user to provide mouse or keyboard input to the virtual machine, enabling the user to play audio output of the virtual machine, etc. Example software-based operational capabilities include sharing clipboard data among the first and second operating systems, providing user verification support to the second operating system, redirecting a drive volume or smart card functionality of the physical computer to the virtual machine, etc.

SUMMARY

Systems, methods, and computer program products are described herein for providing a user interface to a user of a first operating system to enable the user to interact with a second operating system executing in a virtual machine. One example system includes a user device and a virtual machine. The user device is configured to execute a first operating system. The virtual machine is configured to execute a second operating system. The user device includes user interface logic configured to execute within the context of the first operating system and to provide a user interface for enabling a user of the first operating system to interact with the second operating system. The user interface logic is configured to provide a first user interface as the user interface when the first operating system and the second operating system are in communication in accordance with an operating system remote terminal (OSRT) protocol. An OSRT protocol is a communication protocol that enables a user of one operating system to interact with a second operating system through the use of a "terminal client" program running in the context of the first operating system and a "terminal server" program running in the context of the second operating system. The user interface logic is configured to provide a second user interface as the user interface when the first operating system and the second operating system are not in communication in accordance with the OSRT protocol.

In an example method, a first user interface is provided when a first operating system and a second operating system are in communication in accordance with an OSRT protocol. A second user interface is provided when the first operating system and the second operating system are not in communication in accordance with the OSRT protocol.

An example computer program product includes a computer-readable medium having computer program logic recorded thereon for enabling a processor-based system to provide a user interface to a user of a first operating system. The user interface is for interacting with a second operating system executing in a virtual machine. The computer program product includes first and second program logic modules. The first program logic module is for enabling the processor-based system to provide a first user interface when the first operating system and the second operating system are in communication in accordance with an OSRT protocol. The second program logic module is for enabling the processor-based system to provide a second user interface when the first operating system and the second operating system are not in communication in accordance with the OSRT protocol.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
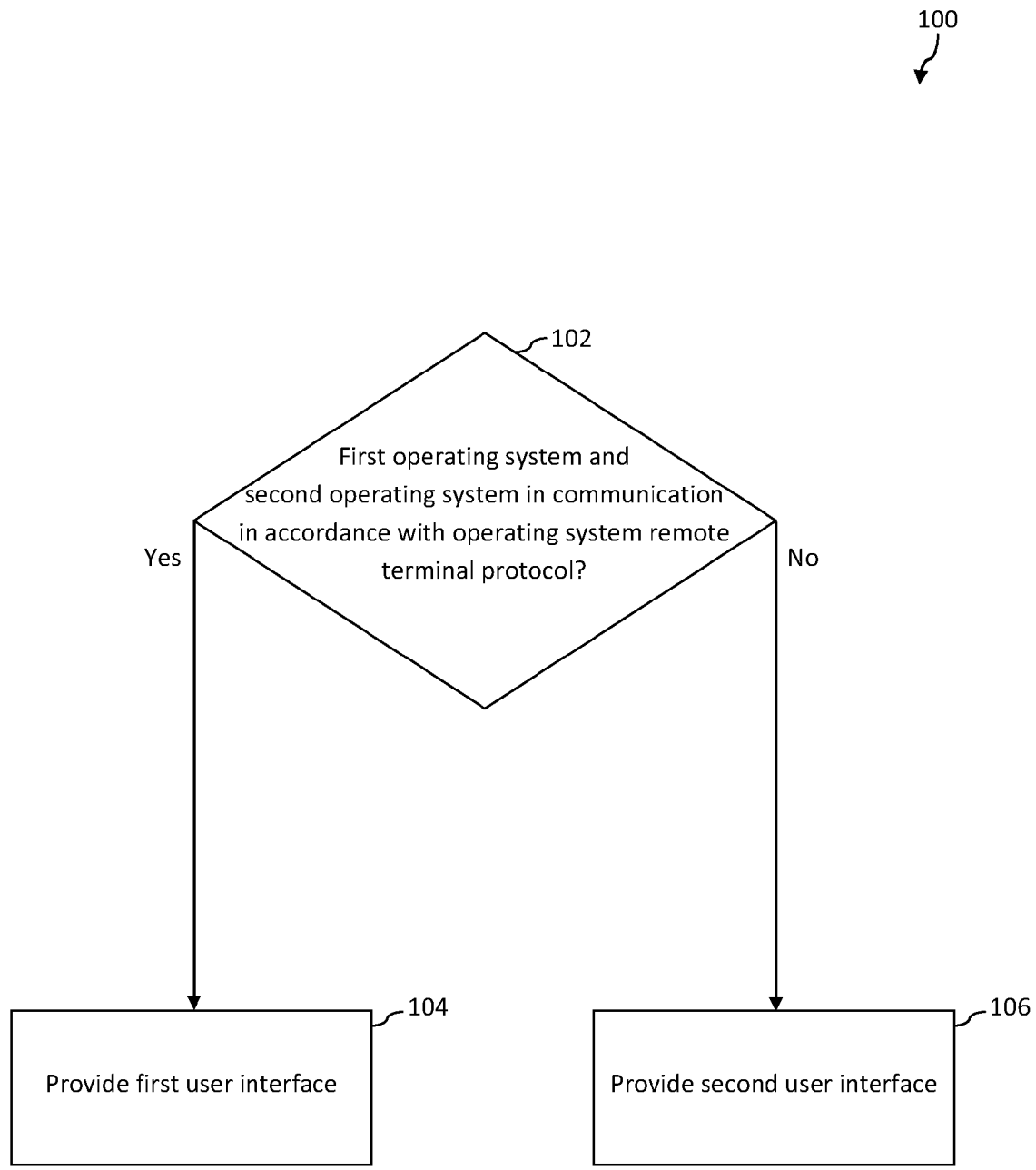
FIG. 1 depicts a flowchart of a method for providing a user interface in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structur-

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

II. Techniques for Providing a User Interface

Embodiments of the present invention provide a user interface to a user of a first operating system to enable the user to interact with a second operating system executing in a virtual machine. One method for providing the user interface will now be described with reference to flowchart 100 of FIG. 1. The method is described herein by way of example and is not intended to be limiting.

As shown in FIG. 1, the method of flowchart 100 begins at step 102 in which a determination is made as to whether the first operating system and the second operating system are in communication in accordance with an operating system remote terminal (OSRT) protocol. As used herein, the term OSRT protocol is defined to mean a communication protocol that enables a user of one operating system to interact with a second operating system through the use of a "terminal client" program running in the context of the first operating system and a "terminal server" program running in the context of the second operating system. Example OSRT protocols include but are not limited to Remote Desktop Protocol (RDP) developed by Microsoft Corporation, Apple Remote Desktop (ARD) developed by Apple Inc., Citrix Independent Computing Architecture (ICA) developed by Citrix Systems, Inc., Remote Framebuffer (RFB) developed by Olivetti Research Laboratory (ORL) and maintained by RealVNC Ltd., the protocol used in pcAnywhere developed by Symantec Corporation, etc. It will be recognized that any suitable OSRT protocol may be utilized for implementing embodiments of the present invention.

If the first and second operating systems are in communication in accordance with an OSRT protocol, a first user interface by which the user of the first operating system may interact with the second operating system is provided to the user at step 104. The first user interface provides certain software-based operational capabilities that are premised on communication in accordance with the OSRT protocol between the first operating system and software that runs within the context of the second operating system. Examples of the software-based operational capabilities may include but are not limited to sharing folder(s) and/or clipboard data among the first and second operating systems, providing user verification support to the second operating system, redirecting a drive volume or smart card functionality of the physical computer to the virtual machine, etc. One or more of the software-based operational capabilities may be based on the redirection of input to and/or output from drivers (e.g., a graphics driver, a keyboard driver, a mouse driver, etc.) running in the context of the second operating system.

However, if the first and second operating systems are not in communication in accordance with the OSRT protocol, a second user interface by which the user of the first operating system may interact with the virtual machine is provided to the user at step 106. The second user interface provides the user with certain hardware-based operational capabilities for interacting with the virtual machine. The hardware-based operational capabilities are based on communication between the first operating system and at least one emulated hardware component of the virtual machine. Examples of such hardware-based operational capabilities include but are not limited to enabling the user to view video output of the virtual machine, enabling the user to provide mouse or keyboard input to the virtual machine, enabling the user to play audio output of the virtual machine, etc.

The second user interface may be capable of operating regardless of whether the second operating system is installed or executing in the virtual machine. For instance, the second user interface may enable the user to diagnose the cause of a termination of communication between the first and second operating systems even if the second operating system fails (i.e., crashes).

In accordance with the foregoing, the first user interface may be thought of as providing an "enhanced mode" of operation in that it provides capabilities beyond those provided by the second user interface; whereas, the second user interface may be thought of as providing a "basic mode" of operation in that it provides relatively limited capabilities, which are available regardless of the existence or status of the second operating system.

Providing the first user interface may include automatically switching from providing the second user interface to providing the first user interface in response to detecting that OSRT communication between the first and second operating systems is established. Providing the second user interface may include automatically switching from providing the first user interface to providing the second user interface in response to detecting a termination of the OSRT communication between the first and second operating systems. Embodiments may enable a user to manually switch between the first and second user interfaces.

Figure 2:
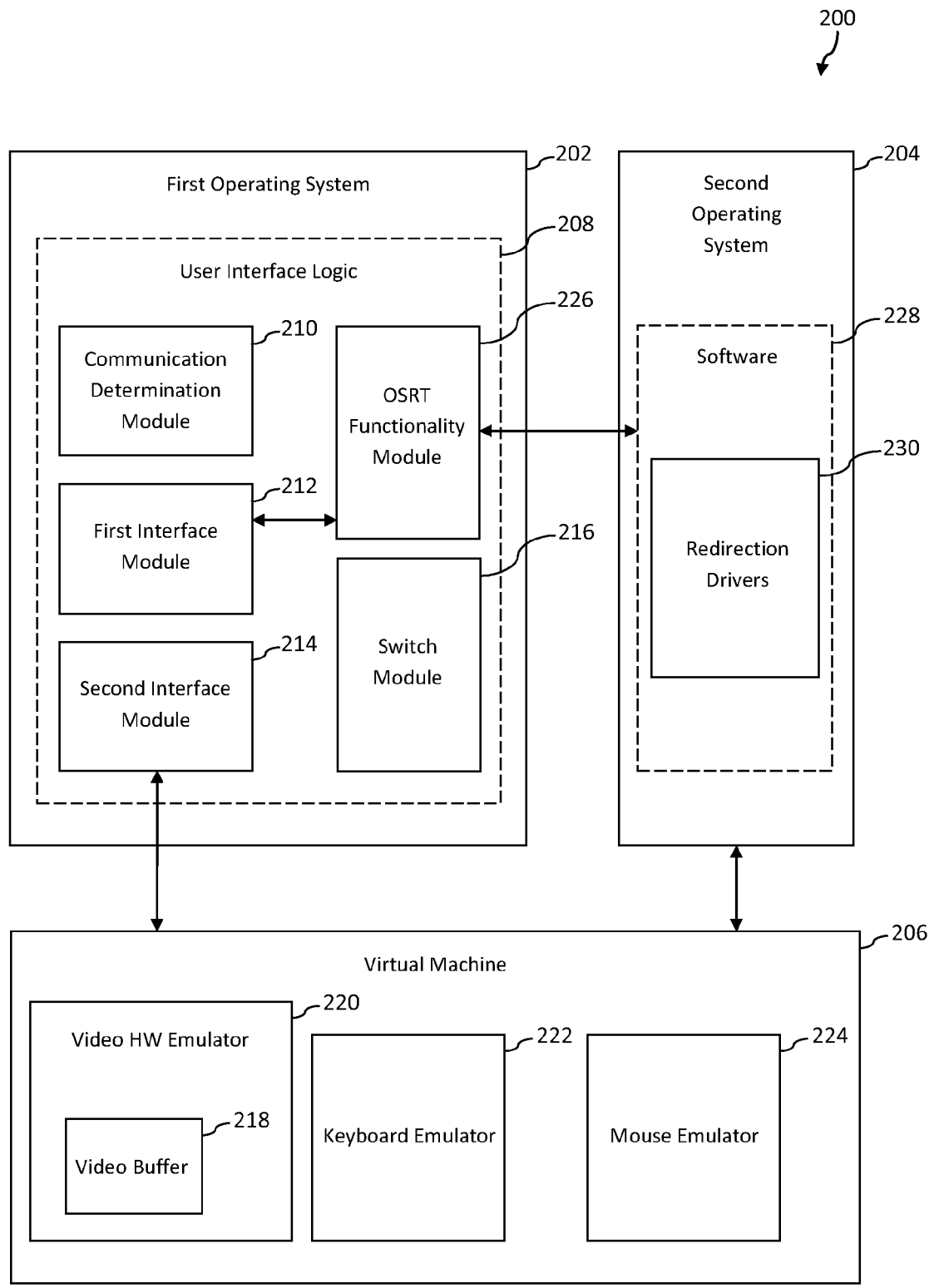
FIG. 2 is a block diagram of an example processing system in accordance with an embodiment of the present invention.

FIG. 2 is a block diagram of an example processing system 200 in accordance with an embodiment of the present invention. Processing system 200 may be used to perform the steps of flowchart 100, though it will be recognized by persons skilled in the relevant art(s) that the steps of flowchart 100 may be performed by any suitable processing system.

Referring to FIG. 2, processing system 200 includes a first operating system 202, a second operating system 204, and a virtual machine 206. First operating system 202 includes user interface logic 208 for generating a user interface that enables a user of first operating system 202 to interact with second operating system 204. User interface logic 208 includes communication determination module 210, first interface module 212, second interface module 214, switch module 216, and OSRT functionality module 226.

Communication determination module 210 is configured to determine whether first operating system 202 and second operating system 204 are in communication in accordance with the OSRT protocol. First interface module 212 is configured to provide the first user interface as the user interface when first operating system 202 and second operating system 204 are in communication in accordance with the OSRT protocol. Second interface module 214 is configured to provide the second user interface as the user interface when first operating system 202 and second operating system 204 are not in communication in accordance with the OSRT protocol.

OSRT functionality module 226 is configured to support the software-based operational capabilities of the first user interface by maintaining an OSRT connection between first operating system 202 and second operating system 204 in accordance with the OSRT protocol.

First interface module 212 is configured to provide a user of first operating system 202 with a first user interface that includes software-based operational capabilities supported by OSRT functionality module 226. Second interface module 214, on the other hand, is configured to provide the user of first operating system 202 with a second user interface that includes the hardware-based operational capabilities supported by communication between second interface module 214 and software running within virtual machine 206. Communication between second interface module 214 and software running within virtual machine 206 may be carried out using an application programming interface (API), such as ActiveX, though the scope of the embodiments is not limited in this respect. Persons skilled in the relevant art(s) will recognize that any suitable protocol may be used for facilitating communication between second interface module 214 and software running within virtual machine 206.

Communication determination module 210 may be configured to monitor the status of communication between first and second operating systems 202, 204. For instance, communication determination module 210 may be configured to detect when OSRT communication between first and second operating systems 202, 204 is established and/or terminated. If communication determination module 210 detects that OSRT communication between first and second operating systems 202, 204 is terminated while first interface module 212 is providing the first user interface, communication determination module 210 provides a termination indicator to switch module 216. Upon receiving the termination indicator, switch module 216 provides an instruction to second interface module 214, instructing second interface module 214 to provide the second user interface. Switch module 216 may further provide a notification to first interface module 214, so that first interface module 212 does not attempt to provide the software-based capabilities of the first user interface to the user while OSRT communication between first and second operating systems 202, 204 is terminated.

If communication determination module 210 detects that communication in accordance with the OSRT protocol between first and second operating systems 202, 204 is established while second interface module 214 is providing the second user interface, communication determination module 210 provides an establishment indicator to switch module 216. Upon receiving the establishment indicator, switch module 216 provides an instruction to first interface module 212, instructing first interface module 212 to provide the first user interface.

The first and/or second interface module 212, 214 may be configured to enable the user to manually switch between the first and second user interfaces. For instance, each of the first and second user interfaces may be configured to include a "Cancel" button or other interface element that the user may select to switch to the other user interface. Switch module 216 may be configured to provide an instruction to the first or second interface module 212, 214 in response to receiving a command from the user. For example, the user may provide a first command to switch from using the first user interface to using the second user interface, in which case switch module 216 provides an instruction to second interface module 214 to provide the second user interface. In this example, switch module 216 may provide a notification to first interface module 212, so that first interface module 212 does not attempt to provide the software-based capabilities of second operating system 204 to the user. In another example, the user may provide a second command to switch from using the second user interface to using the first user interface, in which case switch module 216 provides an instruction to first interface module 212 to provide the first user interface.

Software 228 runs in the context of second operating system 204 that facilitates the provision of the software-based operational capabilities of the first user interface. Software 228 is shown in FIG. 2 to include redirection drivers 230, though the scope of the present invention is not limited in this respect. Like conventional drivers, redirection drivers 230 operate to convert hardware-agnostic function calls from computer programs running within the context of second operating system 204 to hardware-specific commands so that such computer programs can interact with specific hardware devices (e.g., video hardware, a keyboard, a mouse, etc.). However, unlike conventional drivers, redirection drivers 230 are configured to direct the hardware-specific commands to hardware devices associated with first operating system 202 rather than to the emulated hardware devices associated with second operating system 204. One or more of the software-based operational capabilities of the first user interface may be provided based on this redirection.

Second operating system 204 executes in virtual machine 206, which includes a plurality of hardware component emulators. As shown in FIG. 2, virtual machine 206 includes a video hardware (HW) emulator 220, a keyboard emulator 222, and a mouse emulator 224 for emulating respective video hardware, keyboard, and mouse components of virtual machine 206. Persons skilled in the relevant art(s) will recognize that virtual machine 206 may include hardware emulators for emulating other hardware components of virtual machine 206 in addition to emulators 220, 222, and 224. For instance, virtual machine may include an emulator for emulating a keypad, touchpad, stylus, audio hardware, or any other hardware component that enables the user to provide information to and/or receive information from virtual machine 206.

Video HW emulator 220 includes a video buffer 218 for storing pixels that are generated by second operating system 204 and for transferring the pixels to second interface module 214 for display as video output to the user. Video buffer 218 may transfer the pixels to second interface module 214 using an application programming interface (API) control, such as an ActiveX control, though the scope of the embodiments is not limited in this respect.

All of the elements of processing system 200 may be incorporated into a single processing device (e.g., a single computer). Alternatively, the elements may be distributed among a plurality of processing devices. For instance, processing system 200 may be a computer network including first and second processing devices. The first processing device may execute first operating system 202. The second processing device may execute second operating system 204 and virtual machine 206.

Figure 3:
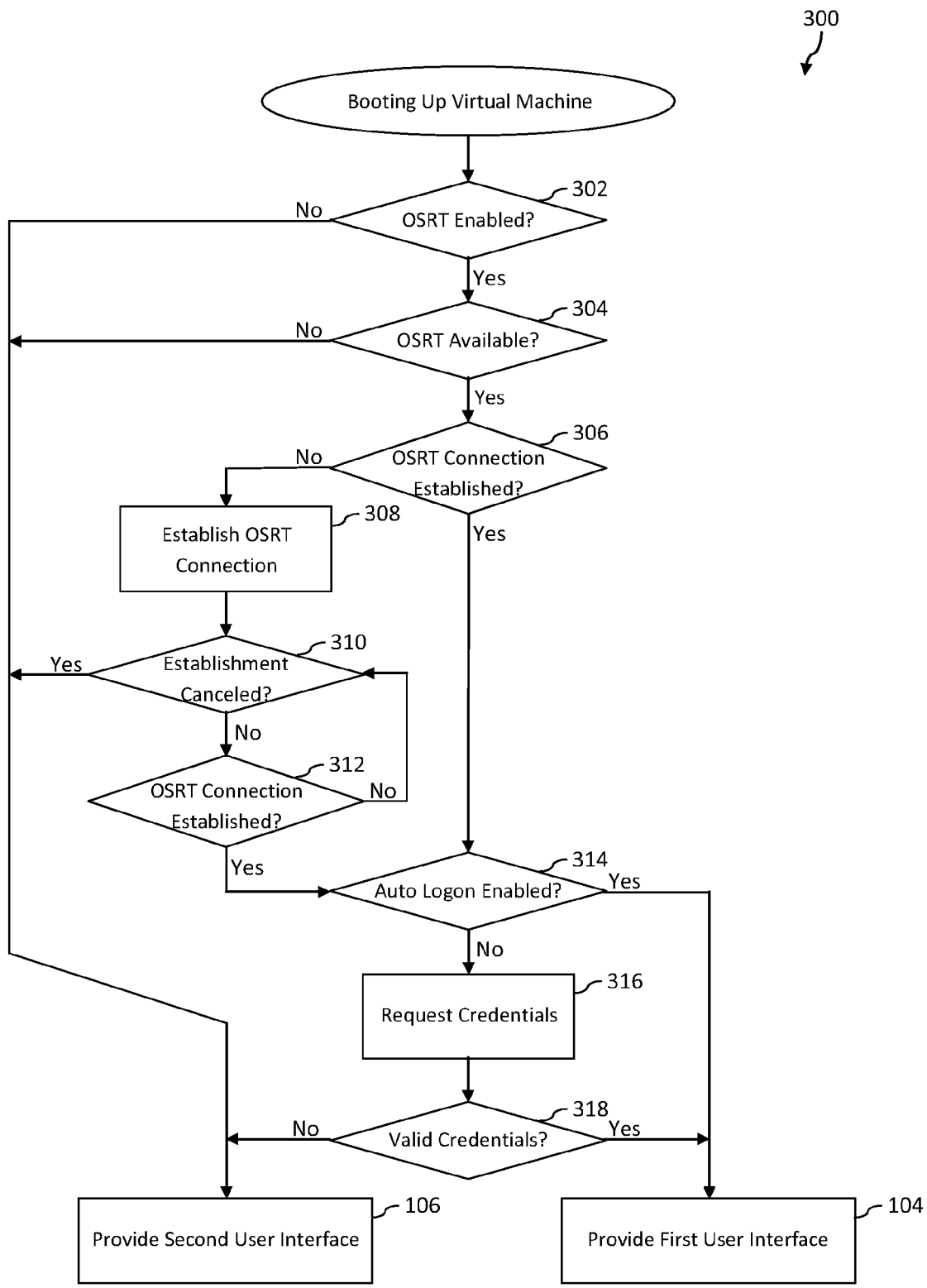
FIG. 3 depicts a flowchart of a method for booting up a virtual machine in accordance with an embodiment of the present invention.
Figure 4:
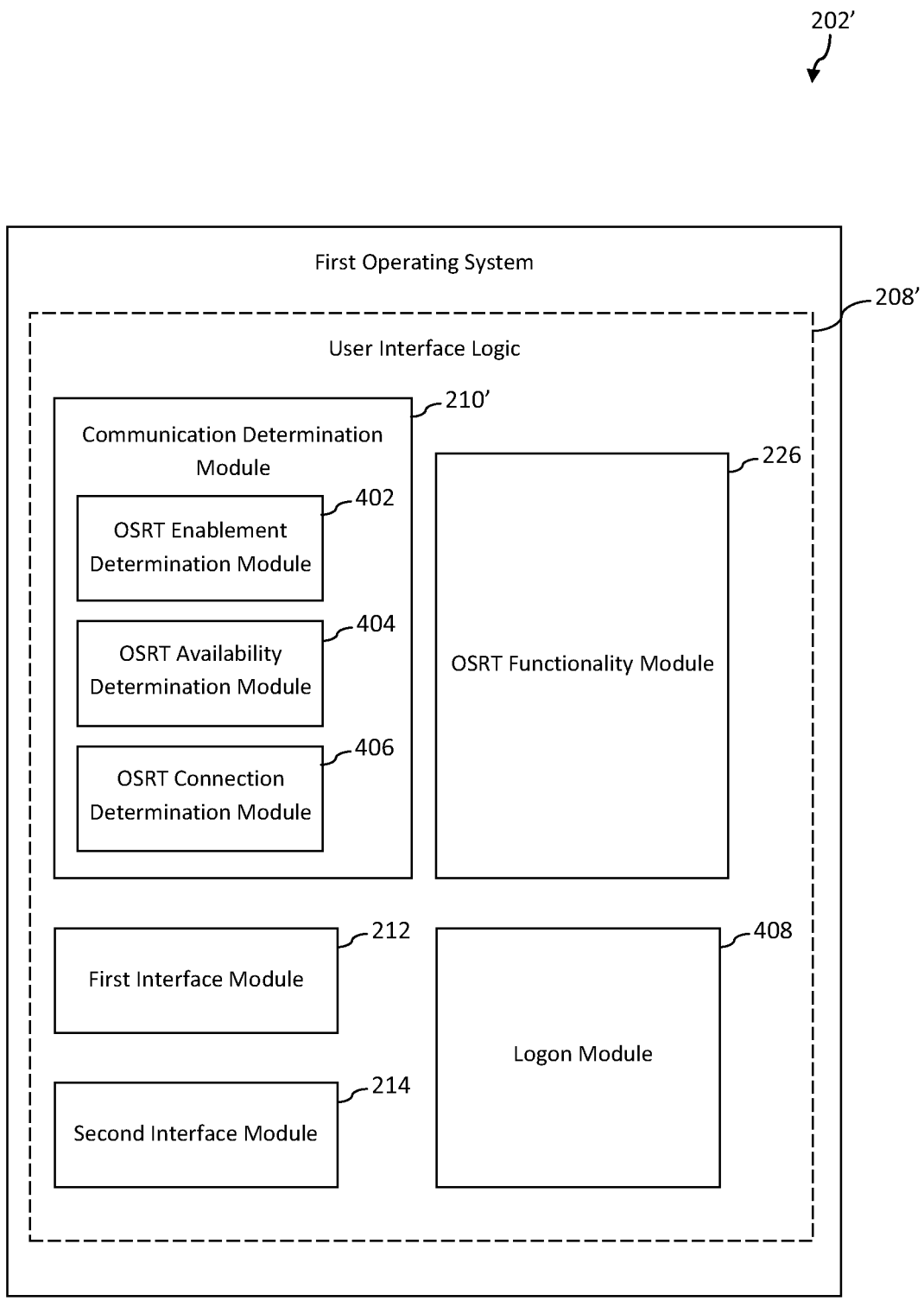
FIGS. 4 and 6 are block diagrams of respective example implementations of the first operating system shown in FIG. 2 in accordance with embodiments of the present invention.

FIG. 3 depicts a flowchart of a method for booting up a virtual machine in accordance with an embodiment of the present invention. The steps of flowchart 300 will be described with reference to elements of an example implementation 202' of first operating system 202 shown in FIG. 2 for illustrative purposes. Example implementation 202' is depicted in FIG. 4. It will be recognized by persons skilled in the relevant art(s) that the steps of flowchart 300 may be performed by any suitable processing system. Moreover, the method is described herein by way of example, and it is noted that various other methods may be used to boot up a virtual machine.

As shown in FIG. 3, the method of flowchart 300 begins at step 302 in which OSRT enablement determination module 402 of communication determination module 210' determines whether communication in accordance with the OSRT protocol is enabled in first operating system 202'. For example, first operating system 202' may be configured to disable OSRT communication functionality with respect to first operating system 202'. If OSRT communication is not enabled in first operating system 202', second interface module 214 provides the second user interface at step 106. If OSRT communication is enabled in first operating system 202', however, flow continues to step 304 in which OSRT availability determination module 404 determines whether communication in accordance with the OSRT protocol is available with respect to second operating system 204.

It will be recognized that OSRT communication is available in second operating system when second operating system 204 is properly configured to support OSRT communication. For instance, OSRT availability determination module 404 may check one or more configuration settings of second operating system 204 to determine whether second operating system 204 is properly configured to support OSRT communication. If OSRT communication is not available in second operating system 204, second interface module 214 provides the second user interface at step 106. However, if OSRT communication is available in second operating system 204, flow continues to step 306 in which OSRT connection determination module 406 determines whether a connection in accordance with the OSRT protocol has been established between first and second operating systems 202', 204.

If an OSRT connection has been established between first and second operating systems 202', 204, flow continues to step 314. Otherwise, OSRT functionality module 226 establishes an OSRT connection at step 308. During this process, OSRT functionality module 226 may generate a startup screen for display to the user, showing a progress indicator to indicate the progress made toward establishing the OSRT connection. The startup screen may include a "Cancel" button or other interface element that the user may click to cancel the establishment of the OSRT connection. OSRT functionality module 226 determines whether establishment of the OSRT connection has been canceled at step 310. The establishment of the OSRT connection may be canceled in any of a variety of ways, such as when the time necessary for establishing an OSRT connection exceeds a threshold, when the user clicks on the "Cancel" button in the startup screen, etc.

If the connection is canceled, second interface module 214 provides the second user interface at step 106. If the connection is not canceled, however, OSRT connection determination module 406 again determines whether a connection in accordance with the OSRT protocol has been established between first and second operating systems 202', 204. If an OSRT connection has not been established between first and second operating systems 202', 204, flow returns to step 310. Otherwise, flow continues to step 314.

Logon module 408 determines whether second operating system 204 is configured for automatic logon. If second operating system 204 is configured for automatic logon, first interface module 212 provides the first user interface at step 104. However, if second operating system 204 is not configured for automatic logon, logon module 408 requests the credentials of the user at step 316.

Logon module 408 determines whether the credentials supplied by the user are valid at step 318. If the credentials are not valid, second interface module 214 provides the second user interface at step 106. However, if the credentials are valid, first interface module 212 provides the first user interface at step 104.

Figure 5:
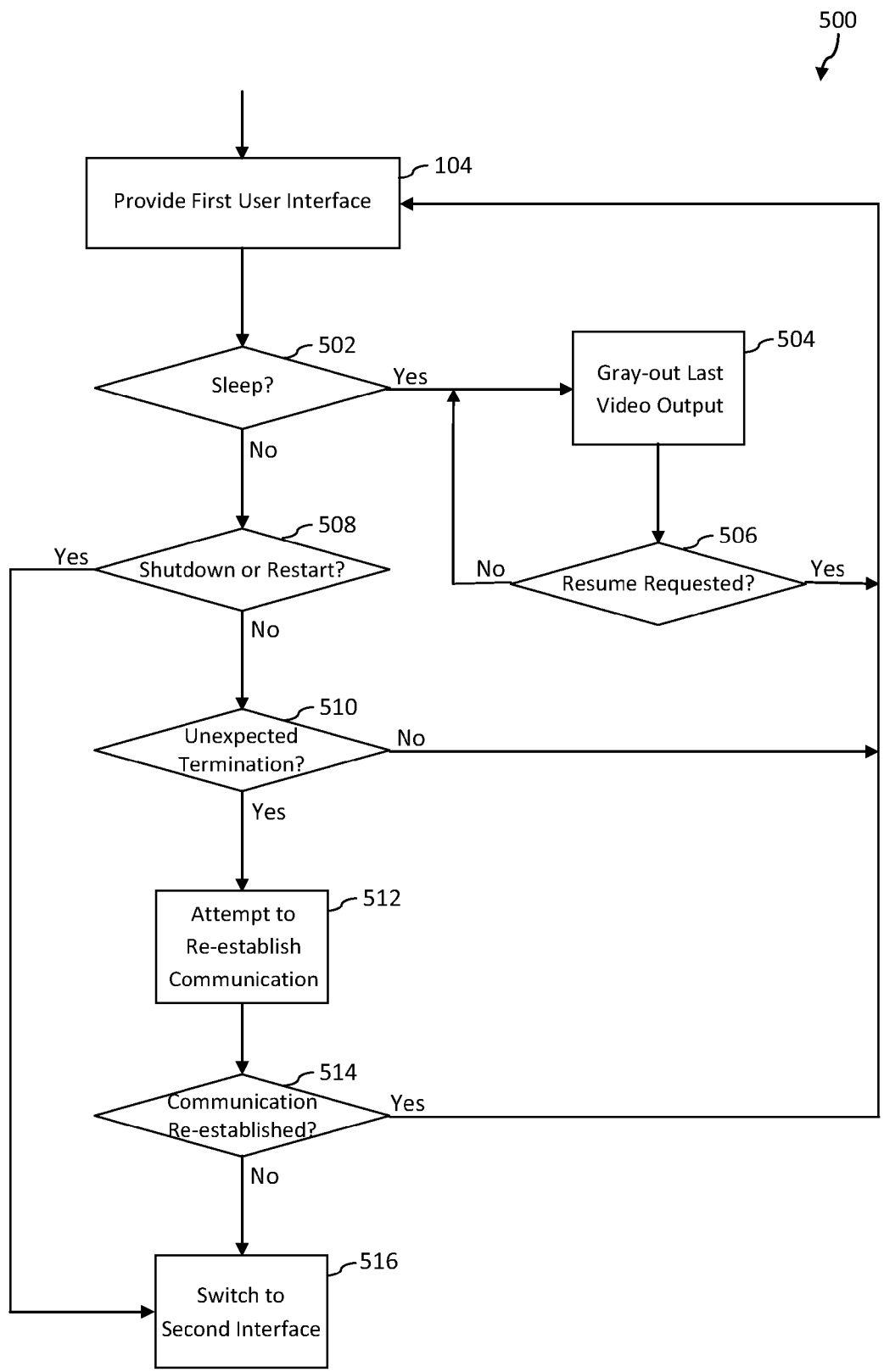
FIG. 5 depicts a flowchart of a method for monitoring communication between first and second operating systems in accordance with an embodiment of the present invention.
Figure 6:
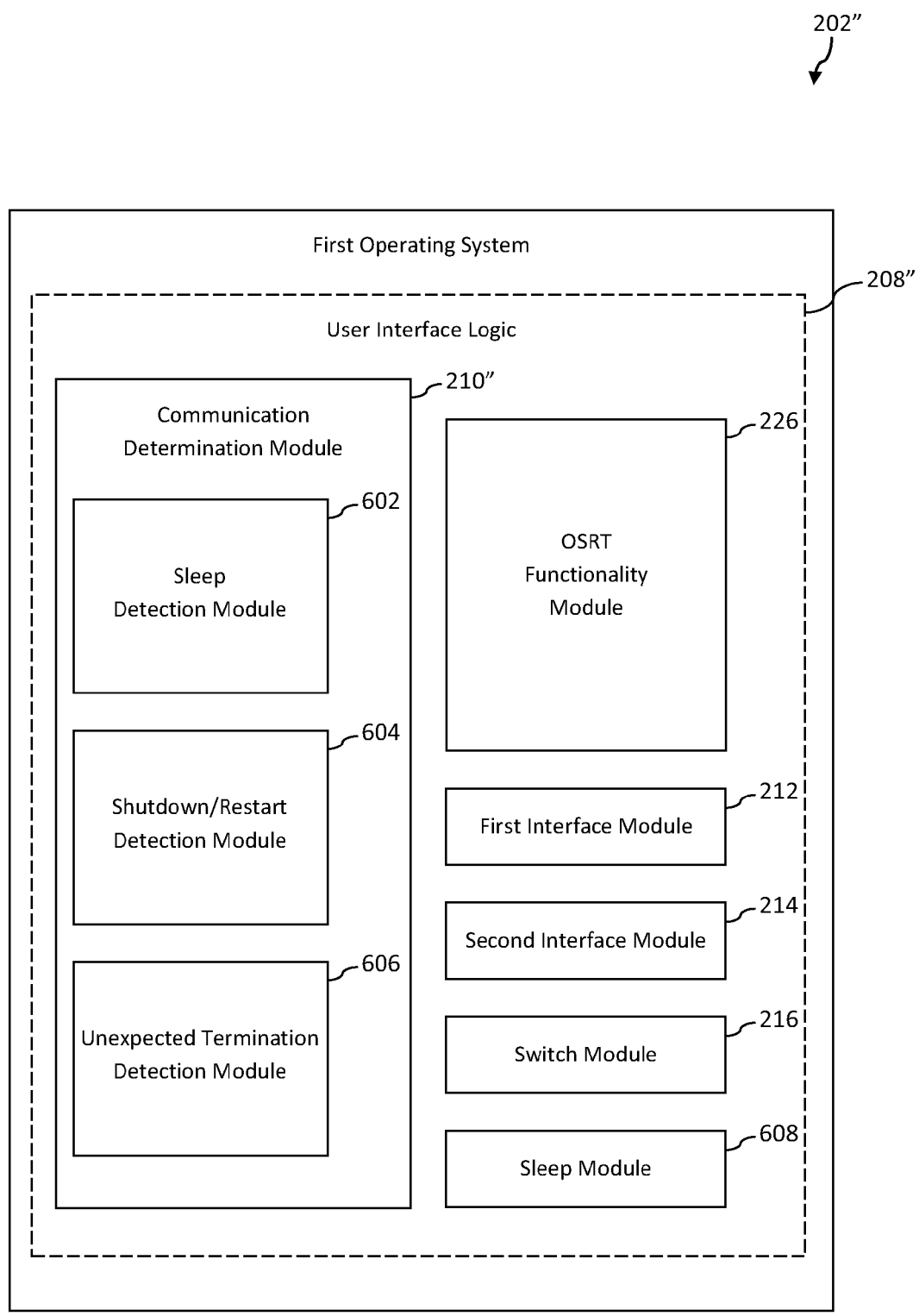

FIG. 5 depicts a flowchart of a method for monitoring communication between first and second operating systems in accordance with an embodiment of the present invention. The steps of flowchart 500 will be described with reference to elements of another example implementation 202" of first operating system 202 shown in FIG. 2 for illustrative purposes. Example implementation 202" is depicted in FIG. 6. It will be recognized by persons skilled in the relevant art(s) that the steps of flowchart 500 may be performed by any suitable processing system. Moreover, the method is described herein by way of example, and it is noted that various other methods may be used for monitoring communication between first and second operating systems.

As shown in FIG. 5, the method of flowchart 500 begins at step 104 in which first interface module 212 provides the first user interface. At step 502, sleep detection module 602 of communication determination module 210" determines whether a sleep operation has been performed with respect to virtual machine 206. A sleep operation causes virtual machine 206 to become inactive, thereby suspending OSRT communication between first and second operating systems 202", 204. If a sleep operation has not been performed with respect to virtual machine 206, flow continues to step 508.

However, if a sleep operation has been performed with respect to virtual machine 206, sleep module 608 grays out the last video output of video hardware emulator 220 within virtual machine 206 at step 504. At step 506, sleep module 608 determines whether a request to resume the OSRT communication between first and second operating systems 202", 204 is received. For example, the interface provided to the user may include a "Resume" button or other interface element, which the user may select to request that the OSRT communication between first and second operating systems 202", 204 is resumed. If a resume request is not received, flow returns to step 504. Otherwise, flow returns to step 104 in which first interface module 212 again provides the first user interface.

At step 508, shutdown/restart detection module 604 determines whether a shutdown operation or a restart operation has been performed with respect to virtual machine 206. If neither a shutdown operation nor a restart operation has been performed with respect to virtual machine 206, flow continues to step 510. However, if a shutdown operation or a restart operation has been performed with respect to virtual machine 206, switch module 216 causes the second user interface to be provided in lieu of the first user interface at step 516. For instance, switch module 216 may provide an instruction to second interface module 214, instructing second interface module 214 to provide the second user interface. In an alternate implementation, a view may be presented to the user that displays an indication of the shutdown/restart process. Switch module 216 may further provide a notification to first interface module 214, so that first interface module 212 does not attempt to provide the software-based capabilities of the first user interface.

At step 510, unexpected termination detection module 606 determines whether an unexpected termination of the OSRT communication between first and second operating systems 202", 204 has occurred. If an unexpected termination of the OSRT communication has not occurred, flow returns to step 104 in which first interface module 212 continues to provide the first user interface.

However, if an unexpected termination of the OSRT communication has occurred, OSRT functionality module 226 attempts to re-establish communication in accordance with the OSRT protocol at step 512. OSRT functionality module 226 determines whether OSRT communication is re-established at block 514. If OSRT communication is re-established, flow returns to step 104 in which first interface module 212 continues to provide the first user interface. If OSRT communication is not re-established, however, switch module 216 causes the second user interface to be provided in lieu of the first user interface at step 516.

Embodiments described herein have a variety of benefits, as compared to conventional processing systems that are capable of providing a user interface for interacting with a virtual machine. For example, embodiments may advantageously enable a user of first operating system 202 to take advantage of software-based operational capabilities for interacting with second operating system 204 when first operating system 202 and second operating system 204 are in communication in accordance with an OSRT protocol, while enabling the user to interact with virtual machine 206 when OSRT communication between first and second operating systems 202, 204 fails to be established or terminates. For instance, the user may be provided the capability of diagnosing the cause of the failure or termination. Moreover, the user may be provided the capability to interact with second operating system 204 during boot up of virtual machine 206.

Embodiments may automatically switch from providing a first user interface to providing a second user interface when a termination of an OSRT communication is detected. Embodiments may automatically switch from providing the second user interface to providing the first user interface when establishment of an OSRT connection is detected. The user may be provided the capability to manually switch between the first and second user interfaces.

III. Example Computer System Implementation

Figure 7:
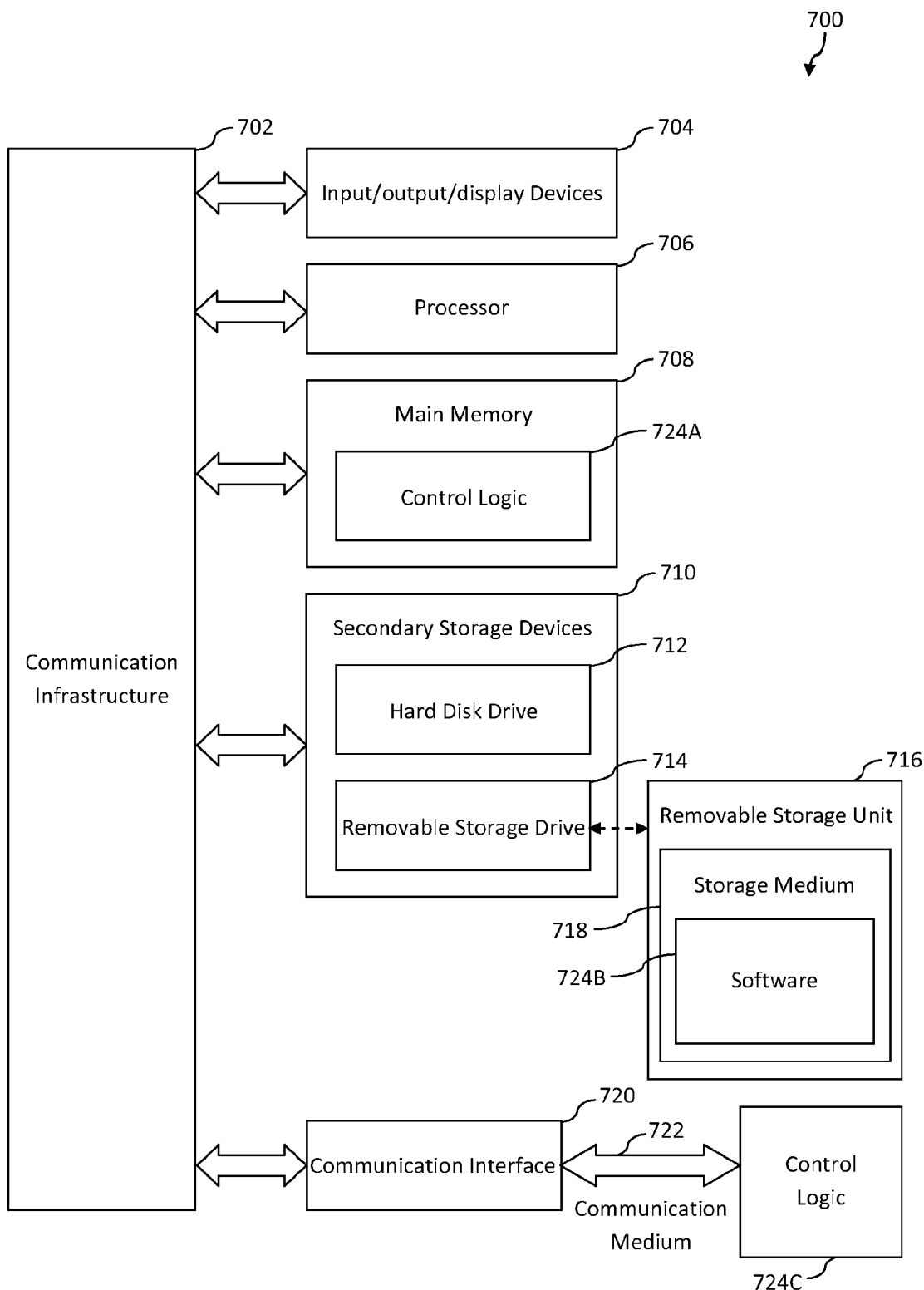
FIG. 7 is a block diagram of a computer system that may be used to implement one or more aspects of the present invention.

The embodiments described herein, including systems, methods/processes, and/or apparatuses, may be implemented using well known servers/computers, such as computer 700 shown in FIG. 7. For example, elements of example processing system 100, including first operating system 202 depicted in FIGS. 2, 4, and 6, second processing system 204 depicted in FIG. 2, virtual machine 206 depicted in FIG. 2, and each of the steps of flowcharts 100, 300, and 500 depicted in respective FIGS. 1, 3, and 5, can each be implemented using one or more computers 700.

Computer 700 can be any commercially available and well known computer capable of performing the functions described herein, such as computers available from International Business Machines, Apple, Sun, HP, Dell, Cray, etc. Computer 700 may be any type of computer, including a desktop computer, a server, etc.

As shown in FIG. 7, computer 700 includes one or more processors (e.g., central processing units (CPUs)), such as processor 706. Processor 706 is connected to a communication infrastructure 702, such as a communication bus. In some embodiments, processor 706 can simultaneously operate multiple computing threads. Processor 706 may be configured to execute any one or more of first operating system 202, second operating system 204, and/or virtual machine 206, for example.

Computer 700 also includes a primary or main memory 708, such as a random access memory (RAM). Main memory has stored therein control logic 724A (computer software), and data.

Computer 700 also includes one or more secondary storage devices 710. Secondary storage devices 710 include, for example, a hard disk drive 712 and/or a removable storage device or drive 714, as well as other types of storage devices, such as memory cards and memory sticks. For instance, computer 700 may include an industry standard interface, such as a universal serial bus (USB) interface for interfacing with devices such as a memory stick. Removable storage drive 714 represents a floppy disk drive, a magnetic tape drive, a compact disk drive, an optical storage device, tape backup, etc.

Removable storage drive 714 interacts with a removable storage unit 716. Removable storage unit 716 includes a computer useable or readable storage medium 718 having stored therein computer software 724B (control logic) and/or data. Removable storage unit 716 represents a floppy disk, magnetic tape, compact disc (CD), digital versatile disc (DVD), Blue-ray disc, optical storage disk, memory stick, memory card, or any other computer data storage device. Removable storage drive 714 reads from and/or writes to removable storage unit 716 in a well known manner.

Computer 700 also includes input/output/display devices 704, such as monitors, keyboards, pointing devices, etc.

Computer 700 further includes a communication or network interface 720. Communication interface 720 enables computer 700 to communicate with remote devices. For example, communication interface 720 allows computer 700 to communicate over communication networks or mediums 722 (representing a form of a computer useable or readable medium), such as local area networks (LANs), wide area networks (WANs), the Internet, etc. Network interface 720 may interface with remote sites or networks via wired or wireless connections. Examples of communication interface 722 include but are not limited to a modem, a network interface card (e.g., an Ethernet card), a communication port, a Personal Computer Memory Card International Association (PCMCIA) card, etc.

Control logic 724C may be transmitted to and from computer 700 via the communication medium 722.

Any apparatus or manufacture comprising a computer useable or readable medium having control logic (software) stored therein is referred to herein as a computer program product or program storage device. This includes, but is not limited to, computer 700, main memory 708, secondary storage devices 710, and removable storage unit 716. Such computer program products, having control logic stored therein that, when executed by one or more data processing devices, cause such data processing devices to operate as described herein, represent embodiments of the invention.

For example, each of the elements of example processing system 100, including first operating system 202 depicted in FIGS. 2, 4, and 6 and its sub-elements, second processing system 204 depicted in FIG. 2, virtual machine 206 depicted in FIG. 2, and each of the steps of flowcharts 100, 300, and 500 depicted in respective FIGS. 1, 3, and 5 can be implemented as control logic that may be stored on a computer useable medium or computer readable medium, which can be executed by one or more processors to operate as described herein.

The invention can be put into practice using software, hardware, and/or operating system implementations other than those described herein. Any software, hardware, and operating system implementations suitable for performing the functions described herein can be used.

IV. Conclusion

While various embodiments of the present invention have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for providing a user interface to a user of a first operating system, the user interface for interacting with a second operating system configured to execute in a virtual machine, the method comprising:
   determining whether a first user interface or a second user interface, which is different from the first user interface, is to be provided as the user interface based on whether the first operating system and the second operating system are in communication in accordance with an operating system remote terminal protocol;
   providing the first user interface, which provides software-based operational capabilities that are premised on communication in accordance with the operating system remote terminal protocol between the first operating system and software that runs within a context of the second operating system, when the first operating system and the second operating system are in communication in accordance with the operating system remote terminal protocol; and
   providing the second user interface, which provides hardware-based operational capabilities for interacting with the virtual machine based on communication between the first operating system and at least one emulated hardware component of the virtual machine without providing the software-based operational capabilities, when the first operating system and the second operating system are not in communication in accordance with the operating system remote terminal protocol.

2. The method of claim 1, further comprising:
   automatically switching from providing the first user interface to providing the second user interface in response to the communication between the first and second operating systems in accordance with the operating system remote terminal protocol being terminated.

3. The method of claim 1, further comprising:
   establishing communication between the first and second operating systems in accordance with the operating system remote terminal protocol; and
   automatically switching from providing the second user interface to providing the first user interface in response to establishing the communication.

4. The method of claim 1, further comprising:
   switching from providing the first user interface to providing the second user interface or from providing the second user interface to providing the first user interface in response to receiving a command from the user.

5. The method of claim 1, wherein providing the second user interface comprises:
   providing the second user interface, which provides the hardware-based operational capabilities including at least one of:
      enabling the user to view video output of the virtual machine,
      enabling the user to provide mouse input to the virtual machine,
      enabling the user to provide keyboard input to the virtual machine, or
      enabling the user to play audio output of the virtual machine.

6. The method of claim 1, wherein providing the first user interface comprises:
   providing the first user interface, which provides the software-based operational capabilities including at least one of:
   enabling the user to share at least one folder of the first operating system with the second operating system,
   enabling the user to share clipboard data among the first and second operating systems,
   providing smart card support to the second operating system, or
   providing user verification support to the second operating system.

7. The method of claim 1, further comprising: redirecting hardware-specific commands, by the software that runs within the context of the second operating system, to hardware devices associated with the first operating system rather than to emulated hardware devices associated with the second operating system when the first operating system and the second operating system are in communication in accordance with the operating system remote terminal protocol.

8. A computer program product comprising a computer-readable storage medium, which is not a signal, having computer program logic recorded thereon for enabling a processor-based system to provide a user interface to a user of a first operating system, the user interface for interacting with a second operating system configured to execute in a virtual machine, the computer program product comprising:
   a first program logic module for enabling the processor-based system to determine whether a first user interface or a second user interface, which is different from the first user interface, is to be provided as the user interface based on whether the first operating system and the second operating system are in communication in accordance with an operating system remote terminal protocol;
   a second program logic module for enabling the processor-based system to provide the first user interface, which provides software-based operational capabilities that are premised on communication in accordance with the operating system remote terminal protocol between the first operating system and software that runs within a context of the second operating system, when the first operating system and the second operating system are in communication in accordance with the operating system remote terminal protocol; and
   a third program logic module for enabling the processor-based system to provide the second user interface, which provides hardware-based operational capabilities for interacting with the virtual machine based on communication between the first operating system and at least one emulated hardware component of the virtual machine without providing the software-based operational capabilities, when the first operating system and the second operating system are not in communication in accordance with the operating system remote terminal protocol.

9. The computer program product of claim 8, further comprising:
a fourth program logic module for enabling the processor-based system to automatically switch from providing the first user interface to providing the second user interface in response to the communication between the first and second operating systems in accordance with the operating system remote terminal protocol being terminated.

10. The computer program product of claim 8, further comprising:
a fourth program logic module for enabling the processor-based system to establish communication between the first and second operating systems in accordance with the operating system remote terminal protocol; and
a fifth program logic module for enabling the processor-based system to automatically switch from providing the second user interface to providing the first user interface in response to the communication being established.

11. The computer program product of claim 8, further comprising:
a fourth program logic module for enabling the processor-based system to switch from providing the first user interface to providing the second user interface or from providing the second user interface to providing the first user interface in response to a command from the user.

12. The computer program product of claim 8, wherein the second user interface provides at least one of:
a hardware-based operational capability that enables the user to view video output of the virtual machine,
a hardware-based operational capability that enables the user to provide mouse input to the virtual machine,
a hardware-based operational capability that enables the user to provide keyboard input to the virtual machine, or
a hardware-based operational capability that enables the user to play audio output of the virtual machine.

13. The computer program product of claim 8, wherein the first user interface provides at least one of:
a software-based operational capability that enables the user to share at least one folder of the first operating system with the second operating system,
a software-based operational capability that enables the user to share clipboard data among the first and second operating systems,
smart card support to the second operating system, or
user verification support to the second operating system.

14. The computer program product of claim 8, wherein the software that runs within the context of the second operating system is configured to redirect hardware-specific commands to hardware devices associated with the first operating system rather than to emulated hardware devices associated with the second operating system when the first operating system and the second operating system are in communication in accordance with the operating system remote terminal protocol.

15. A system comprising:
a user device configured to execute a first operating system; and
a virtual machine configured to execute a second operating system;
the user device including user interface logic configured to execute within the context of the first operating system and to provide a user interface for enabling a user of the first operating system to interact with the second operating system,
the user interface logic configured to determine whether a first user interface or a second user interface, which is different from the first user interface, is to be provided as the user interface based on whether the first operating system and the second operating system are in communication in accordance with an operating system remote terminal protocol,
the user interface logic configured to provide the first user interface as the user interface when the first operating system and the second operating system are in communication in accordance with the operating system remote terminal protocol, the first user interface configured to provide software-based operational capabilities that are premised on communication in accordance with the operating system remote terminal protocol between the first operating system and software that runs within a context of the second operating system,
the user interface logic configured to provide the second user interface as the user interface when the first operating system and the second operating system are not in communication in accordance with the operating system remote terminal protocol, the second user interface configured to provide of hardware-based operational capabilities for interacting with the virtual machine based on communication between the first operating system and at least one emulated hardware component of the virtual machine without providing the software-based operational capabilities.

16. The system of claim 15, wherein the at least one emulated hardware component of the virtual machine comprises one or more of emulated video hardware, an emulated keyboard, or an emulated mouse.

17. The system of claim 15, wherein the user interface logic includes a switch module configured to automatically switch from providing the first user interface to providing the second user interface in response to the communication between the first and second operating systems in accordance with the operating system remote terminal protocol being terminated.

18. The system of claim 15, wherein the user interface logic includes a switch module configured to automatically switch from providing the second user interface to providing the first user interface in response to establishing communication between the first and second operating systems in accordance with the operating system remote terminal protocol.

19. The system of claim 15, wherein the user interface logic includes a switch module configured to automatically switch from providing the first user interface to providing the second user interface in response to the communication between the first and second operating systems in accordance with the operating system remote terminal protocol being terminated.

20. The system of claim 15, wherein the software that runs within the context of the second operating system is configured to redirect hardware-specific commands to hardware devices associated with the first operating system rather than to emulated hardware devices associated with the second operating system when the first operating system and the second operating system are in communication in accordance with the operating system remote terminal protocol.

* * * * *